Patented Aug. 20, 1940

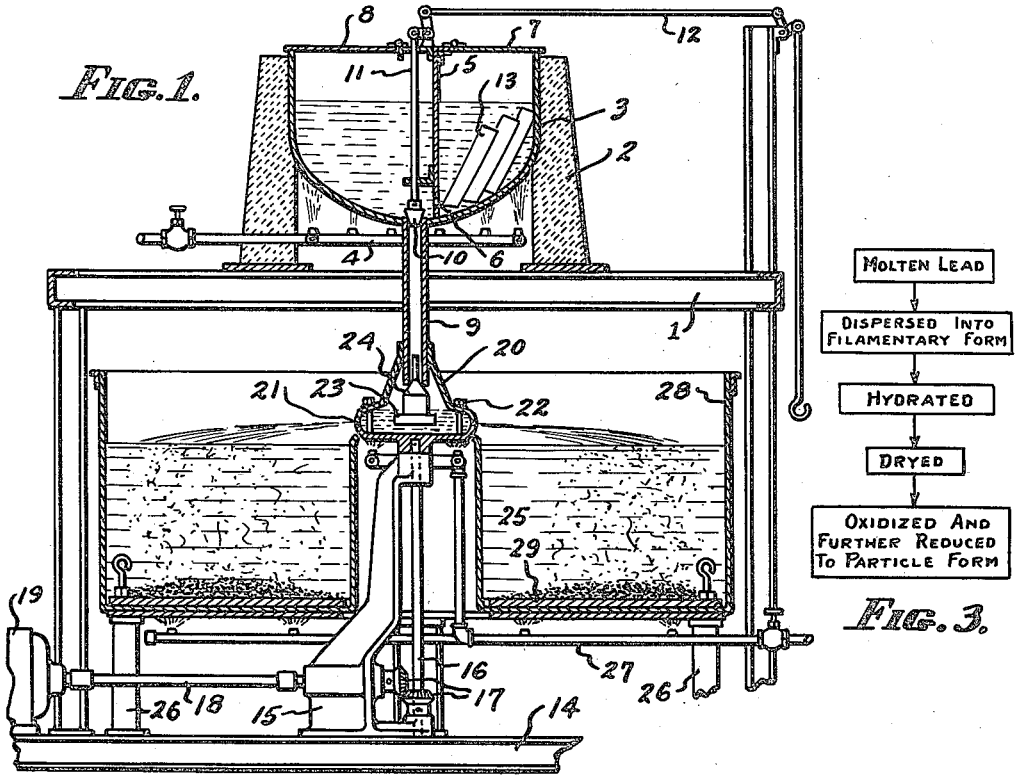
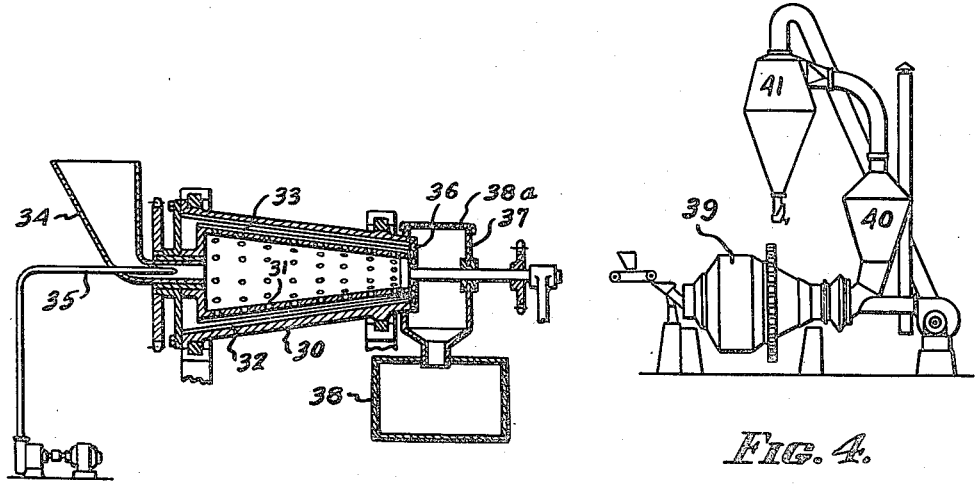

2,211,775

UNITED STATES PATENT OFFICE 2,211,775

PROCESS AND APPARATUS FOR THE PRODUCTION OF COMPOSITIONS OF LEAD AND ITS OXIDES AND COMPOSITIONS OF RELATED PRODUCTS

Charles F. Haunz, Maywood, Ill., assignor to The Richardson Company, Lockland, Ohio, a corporation of Ohio Application May 15, 1937, Serial No. 142,862

5 Claims. (Cl. 23—146)

My invention relates generally to the production of mixtures or compositions of lead and its oxides, and compositions of related metals and their oxides, such as zinc, tin, aluminum, etc., by controlling the oxidation of the metal in very finely divided form. Hitherto the best processes for the production of such products involved the grinding of lead into very finely divided form and the concurrent oxidation thereof by a long and tedious process. In one such process masses or balls of lead have been tumbled in a large tumbling barrel, whereby there was a slow attrition of the lead and at least partial oxidization of the finely divided material progressively. Such processes are slow and do not give a high productivity for the time and mechanical energy involved, and also they are somewhat difficult of control.

In my process I start with molten lead and form it while molten into an extremely finely divided filamentary condition, as is hereinafter described. As a step in my process, I thereupon hydrate the finely divided lead, which may be accomplished very rapidly. The hydrated product is then further finely divided in a dried state under conditions of controlled oxidation, and a fine, uniform lead composition is formed.

Among the uses for this material may be mentioned the formation of plates for electric storage batteries, the use of the material as a pigment in paints, or the like, and the use of the material as a starting material for the production of other lead compounds, such as pure higher oxides, arsenates, etc.

The various objects of my invention will be set forth hereinafter or will be apparent to one skilled in the art upon reading these specifications; and these objects I accomplish in that process and through the use of that arrangement and construction of parts of which I shall now describe an exemplary embodiment. Reference is, therefore, made to the drawing wherein:

Figure 1 is a sectional view of an apparatus which I may employ for the production of finely divided filamentary metal.

Figure 2 is a sectional view of an apparatus which I may employ for the further sub-division of the hydrated lead material and the further oxidation of it.

Figure 3 is a diagrammatic showing of the various steps of my processes in which the steps are indicated by appropriate legends, and which will not require special description herein, since it constitutes a diagrammatic showing of the various steps which I will hereinafter describe.

Figure 4 is a diagrammatic showing of another type of mill that I may use.

In the practice of my invention I prefer to use, but I am not limited to, an apparatus such as I have shown in Figure 1, for the manufacture of the finely divided metal. In this figure I have shown mounted on a floor or base 1 a cupola having walls to enclose a tank 3. This tank will be heated in any suitable way and I have indicated for the purpose a series of gas burners shown generally at 4. Other heating means, such as electrical heating means, may be employed if desired.

The tank 3 is used for melting the lead or other metal which is to be treated. Preferably it is made with a dividing wall 5 which joins with the sides of the tank excepting for the small opening 6 near the bottom thereof. The tank may have a cover comprising members 7 and 8, preferably hinged at the dividing wall. A pipe 9 provides an outlet from the bottom of the tank upon one side only of the dividing wall 5.

I may, if desired, provide a plug 10 for closing off the drainage opening and actuated by a rod 11 attached to a pivoted operating lever 12. Pigs of the metal for treatment are placed in one portion of this tank and are indicated at 13. These pigs are melted by the heat and the molten metal flows into the other part of the tank through the opening 6. Any impurities or dross formed by oxidation either of the molten metal or of the pigs floats upon the molten metal and, therefore, will not enter the outlet of the tank.

The outlet pipe 9 delivers the molten metal to a rotating means for giving it a finely divided form. On a sub-floor 14 I mount a suitable bearing bracket 15 in which a vertical shaft 16 is journaled. This shaft may be driven by a pair of bevel gears 17 from a shaft 18 also journaled in the bracket and connected to a motor or other source of power 19. The shaft 16 is surmounted by a dispersing device, as shown. This device may have a number of forms. A simple form has been indicated comprising an upper portion 20 and a lower portion 21 joined together as at 22. The member 21 is fixed to the shaft 16 so that the dispersing device revolves as a unit therewith. The two parts 20 and 21 thus form a housing for receiving the molten metal. It revolves at high speed sending the molten metal out through minute holes in a finely divided form, usually and preferably in the form of fine filaments.

As set forth in a co-pending application in the name of Adolph F. Krauss, entitled Process of making a dispersing mechanism, Serial No. 146,259, filed June 3, 1937, an excellent and inexpensive way of providing the necessarily minute perforations is to provide meeting parts in this rotating housing of relatively small thickness and then knurl one of these parts at least, so as to provide passageways of exceedingly small diameter. Preferably the openings or passageways are exceedingly small, say of the order of .0015 inch. So far as the processes and apparatus herein described are concerned, they are not limited to this particular method of forming the perforations.

The molten metal is delivered by the pipe line into the housing aforesaid, and in order to control the flow I prefer to provide a float device which will close off the pipe line when the molten metal in the dispersing head has risen to the desired level. Such a float may be made of iron or other suitable material and I have indicated a float having a body 23 and an upward projection 24 serving to close off the pipe line when the float is raised.

The operation of the dispersing head, which will be driven at high speed by the motor 19 is to send the metal out through the perforations aforesaid in a very finely divided condition. It will be within the skill of the worker in the art to adjust the speed of the driving means in relation to the size of the perforations and to the temperature of the molten metal as it enters the dispersing head, as well as with respect to the distance to which it is desired that the dispersing head throw the metal. The metal should be above its melting point but not so high in temperature as to form droplets instead of filaments.

For many uses it will be preferable to catch and handle the finely divided filamentary metal dry as will hereinafter be set forth. However, particularly where the filamentary metal is immediately to be converted into the compound, it may be found convenient to catch it in water; and for this purpose I have provided a tank 25 of annular form so that the shaft 16 may pass therethrough. This tank is suitably supported by supporting means 26 and the water in its may be kept heated by a suitable heating means, such as the gas burners 27. The outer circular wall of this tank is preferably continued up beyond the inner wall, as shown at 28, to catch any material which may be thrown too far outwardly in a radial direction.

By the means set forth, it is possible to make filamentary lead or other metals in exceedingly finely divided condition. In the commercial manufacture of lead I am currently making filamentary materials of a thickness of approximately .003 of an inch, and of a length ranging up to one inch. Longer filaments can be made at lower speeds. In converting the metal into a filamentary form, the lead or other metal must of course be above its melting point but should not be too high in temperature, since otherwise the tendency is to form droplets instead of filaments. Ordinarily I prefer to operate at a temperature not more than 20% above the liquidation temperature.

The molten lead or other metal accumulates in this tank in finely divided form and may be periodically or continuously removed therefrom. Suitable openings may be provided in the side of the tank for this purpose, or I can provide a ring-like device in the bottom of the tank indicated at 29, which may be raised by any suitable mechanical means until the finished material can be scraped off of it over the edge 28 of the tank.

Pursuant to my process of converting a finely divided filamentary metal into the compositions to which I have referred, it will ultimately be treated by some sort of milling operation in the presence of oxidizing conditions. With soft metallic filaments, however, milling operations involving impact are likely to cause a balling or massing of the filamentary materials to such an extent as to lose a great part of the advantage of having the materials initially in finely divided form. A very slight coating of some substance upon the surfaces of the lead or other metallic filaments will eliminate this tendency. It is most convenient to form such a thin coating by hydration. If the metallic filaments are caught in water as I have described, they may be dried in air preferably under the influence of heat and when so treated will be found to have upon their surfaces a satisfactory coating probably comprising in part a hydrate and in part an oxide. The wetted metallic filaments may be placed in a heated hopper and dried with agitation in the presence of air. When lead is so treated the filamentary material will assume a grayish or yellowish appearance and will be suitable for milling. Dry metallic filaments may be treated in a somewhat similar manner by being wet and then dried; or they may be put into a suitable container and treated with live steam in the presence of air. The material may be and preferably is quite dry at the start of the subsequent milling operation but need not be entirely dry. It should not, however, carry enough water to give it a strong tendency to clot or mass together.

My materials, if so treated are susceptible to a variety of milling treatments in the presence of air or oxidizing gas. Ball mills may be employed and also other types of mills.

While this invention is not limited thereto, I have illustrated in Figure 2 an apparatus for this purpose consisting of an outer shell 30 and an inner preferably perforated shell 31. These shells are mounted for rotation in ways which will be clear to the man skilled in the art. The outer shell is driven at a relatively slow speed in one direction and is preferably provided with internal ribs or pins indicated at 32. The inner shell 31 is preferably driven at a very much higher speed in the opposite direction and may also be provided with external ribs or pins 33. The material may be fed between the two shells; but if the inner shell is perforated, it may be fed into the inner shell through a suitable intake or delivery hopper or pipe 34. Air for oxidation and drying will also be fed into the machine and may be introduced through an air pipe 35.

In the operation of this machine the ribs or pins on the outer shells will pick up the material and carry it upwardly. By reason of the slow rotation of the outer shell the material will fall towards the inner shell which is rotating very rapidly in the opposite direction. The inner shell will not only be creating a current of air in the machine, but also will be tending to throw material toward the outer shell. Thus, it is producing a turbulence within the machine which works to swirl the particles around and throw them against each other. The oxidized portions are thus worn away and the oxidation of additional portions of the material proceeds rapidly, due to the oxygen contained in the introduced air. At the exit end of the shells, there is a fine screen 36 through which the finished material, if it is of fine enough subdivision, will pass. The heavier materials, of course, remain in the shells; and I prefer to make my shells tapered, as shown, so that the heavier materials tend to gravitate toward the larger end and away from the screen 36 and into a suitable housing 37; and the finished material may fall therefrom into a desired bin or container 38. Means may be provided to separate the material from the air. One of these means might be a cloth top 38a for the housing 37, or I may employ a cloth bag of large dimensions, or a toll stand pipe on the housing 37, or, if desired, a centrifugal separator.

The mechanism is as shown preferably entirely enclosed so that the oxide dust does not get into the room in which the device is located.

Other types of mills may be employed and I have illustrated in Figure 4 the type of mill commonly known as the Hardinge mill comprising a tapered conical rotating housing 39 mounted to be driven and having therein a plurality of balls of different sizes. These balls for example may be steel balls. The material is fed into the mill from the large end of the cone, and the finely divided material over-flows at the small end. The construction of the mill is such as to effect a preliminary separation of the coarser materials from the finer materials so that substantially only the finer materials are delivered at the exit end of the machine. The machine may be equipped with air separation and collection devices 40 and 41.

Still other types of mill may be employed, such as, for example, the Raymond impact mill.

The finished product, delivered by the process steps, thus described, is an exceedingly finely divided black or brownish-black lead composition, containing usually approximately 50% of free lead and 50% of oxide calculated on the basis of lead monoxide.

The material is useful in the ways indicated above. Upon roasting in air at a temperature of approximately 1000 degrees Fahrenheit for approximately one hour the material may be converted into totally soluble lead monoxide or litharge where lead is the metal employed. Upon roasting at a somewhat lower temperature for a much longer period, the material may be converted into red lead.

The litharge, being completely soluble, in acetic acid solution forms a convenient starting material for the manufacture of a wide variety of lead compounds. It is useful in the manufacture of storage battery plates as such, and in other ways which have been mentioned herein.

Modifications may be made in my invention without departing from the spirit of it. Having thus described my invention, what I claim as new and desire to secure by Letters Patent, is:

1. A process of producing a composition of lead and its oxides which comprises reducing metallic lead to a finely divided filamentary form, forming a coating thereon sufficient to prevent coalescence of the lead filaments during a milling operation, and subjecting the lead in said form and substantially dry, to a milling operation in the presence of an oxidizing atmosphere.

2. A process of producing a composition of lead and its oxides which comprises melting the lead and treating the liquid lead so as to bring it into a fine filamentary form while still in a metallic condition, thereupon treating the lead with water and evaporating the water therefrom so as to produce upon the surfaces of the filamentary lead a coating sufficient to prevent coalescence during a milling operation, and thereafter converting a portion of the lead into an oxide by milling the treated filamentary material dry in the presence of an oxidizing atmosphere.

3. A process of producing a composition of lead and its oxides which comprises melting the lead and treating the liquid lead so as to bring it into a fine filamentary form while still in a metallic condition, thereupon treating the lead with water and evaporating the water therefrom so as to produce upon the surfaces of the filamentary lead a coating sufficient to prevent coalescence during a milling operation, and thereafter converting a portion of the lead into an oxide by milling the treated filamentary material dry in the presence of an oxidizing atmosphere to the extent of the producing a composition of highly reactive character and comprising in part free lead and in part oxide of lead both in finely divided form.

4. A process of producing a composition of lead and its oxides which comprises reducing metallic lead to a filamentary form having an approximate filamentary diameter of .003 inch, wetting the metallic filaments so formed and drying them so as to produce on the surfaces thereof a coating of such character as will prevent coalescence during a milling operation, then milling the material dry in the presence of an oxidizing atmosphere.

5. A process of producing a composition of lead and its oxides which comprises reducing metallic lead to a filamentary form having an approximate filamentary diameter of .003 inch, wetting the metallic filaments so formed and drying them so as to produce on the surfaces thereof a coating of such character as will prevent coalescence during a milling operation, then milling the material dry in the presence of an oxidizing atmosphere to the extent of producing a composition of highly reactive character and containing 60 to 50 per cent of free lead and 40 to 50 per cent of oxide of lead calculated on the basis of lead monoxide.

CHARLES F. HAUNZ.